(12) United States Patent
Vogel et al.

(10) Patent No.: US 7,498,389 B2
(45) Date of Patent: Mar. 3, 2009

(54) MULTI-COMPONENT KIT OF EPOXY RESIN AND MANNICH BASE COMPONENTS

(75) Inventors: Martin Vogel, Glottertal (DE); Juergen Gruen, Boetzingen (DE); Elke Wasmer, Emmendingen (DE); Christain Schlenk, Denzlingen (DE); Joachim Schaetzle, Kenzingen (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 233 days.

(21) Appl. No.: 10/584,251

(22) PCT Filed: Dec. 22, 2004

(86) PCT No.: PCT/EP2004/014559

§ 371 (c)(1),
(2), (4) Date: Jun. 23, 2006

(87) PCT Pub. No.: WO2005/090433

PCT Pub. Date: Sep. 29, 2005

(65) Prior Publication Data

US 2007/0119745 A1    May 31, 2007

(30) Foreign Application Priority Data

Feb. 19, 2004    (DE) .................. 10 2004 008 464

(51) Int. Cl.
*C08K 5/05* (2006.01)
*C08L 63/00* (2006.01)
*C08L 63/02* (2006.01)
*C09J 163/00* (2006.01)
*C09J 163/02* (2006.01)

(52) U.S. Cl. .................. 525/523; 156/330; 523/456; 525/503; 525/524

(58) Field of Classification Search .................. None
See application file for complete search history.

(56) References Cited

U.S. PATENT DOCUMENTS

| | | | |
|---|---|---|---|
| 4,481,349 A | | 11/1984 | Marten et al. |
| 5,576,108 A | * | 11/1996 | Neumann et al. ............ 428/413 |
| 5,578,685 A | | 11/1996 | Neumann et al. |
| 6,214,159 B1 | * | 4/2001 | Armin et al. ................. 156/330 |
| 6,376,579 B1 | * | 4/2002 | Mishra et al. ................ 523/466 |
| 6,645,340 B2 | * | 11/2003 | Gienau et al. ................ 156/330 |

FOREIGN PATENT DOCUMENTS

| | | |
|---|---|---|
| DE | 27 55 906 | 6/1979 |
| DE | 28 23 682 | 12/1979 |
| DE | 31 24 232 | 2/1983 |
| DE | 32 33 565 | 3/1984 |
| DE | 689 22 938 | 11/1995 |
| EP | 0 003 479 | 8/1979 |
| EP | 0 601 668 | 6/1994 |
| FR | 2839314 | * 11/2003 |
| WO | 02/079293 | 10/2002 |
| WO | 02/079341 | 10/2002 |

* cited by examiner

*Primary Examiner*—Robert Sellers
(74) *Attorney, Agent, or Firm*—Michael J. Striker

(57) ABSTRACT

A multi-component kit for a curable composition for fixing purposes, comprising an epoxy component (a), which comprises curable epoxides, and a hardener component (b), which comprises a Mannich base formulation, and the use of Mannich base formulations and, especially, further additives in hardener components for epoxy resins, the Mannich base formulation having specific properties (viscosity, H equivalents, content of free phenol derivatives). The multi-component kits according to the invention can be used within a broad temperature range and enable mortar compositions to be produced which, after curing, exhibit a particularly large tolerance range for temperatures and exhibit particularly high bond stress values at low temperatures and, especially, also at high temperatures.

14 Claims, No Drawings

MULTI-COMPONENT KIT OF EPOXY RESIN AND MANNICH BASE COMPONENTS

The invention relates to a multi-component kit for a curable composition for fixing purposes, comprising an epoxy component (a), which comprises curable epoxides, and a hardener component (b), which comprises a Mannich base formulation, and to the use of Mannich base formulations and, especially, further additives in hardener components for epoxy resins.

Curable two-component epoxy-based compositions are known in principle. For example, they are used in the production of lacquers, in the production of coatings and as moulding compounds and the like.

Two-component mortar compositions based on epoxy resins and amine hardeners are also known in the field of fixings, for example for fixing anchoring means, such as anchoring rods.

Disadvantages of known epoxy resins are, in particular, that they can be used only within a comparatively narrow temperature range, because otherwise the curing proceeds insufficiently quickly and completely, and also that the temperature range within which the cured compositions can be used (temperature tolerance range) is smaller than, for example, in the case of UP- or vinyl-ester-based resins. For epoxy resins in accordance with the prior art, for example, a background temperature of between +5 and +40° C. is required, whereas in the case of UP and vinyl ester resins temperatures down to −10° C. are still tolerable, and the temperature tolerance rage for the cured products is between −40° C. and +50° C., while in the case of vinyl ester products that range is from −40 to +100° C. and in the case of UP products from −40 to 80° C. DE 100 02 605 provides two-component systems in which the mortar component is based on the use of cross-linking reactive diluents having functional epoxy groups with an epoxy functionality of at least 2. Here too, however, the resulting mortars exhibit sufficiently high load values only in the range of from −5 to +60° C.

The aim of the present invention is therefore to provide for fixing purposes new two-component epoxy resins which have advantageous properties in comparison with the epoxy resins known hitherto and which, especially, are also still workable at relatively low temperatures and which, more especially, have an increased temperature tolerance range after curing, more especially also at relatively high temperatures, such as may occur, for example, on the surfaces of a building exposed to sunlight.

It has now been found, surprisingly, that this aim can be achieved by the use of special Mannich base formulations as amine hardeners, such Mannich base formulations having very specific properties.

The invention relates to a multi-component kit, as described in the introduction, characterized in that the Mannich base formulation has H equivalents in the range from 40 to 80, a viscosity in the range from 500 to 2700 mPas and a content of free phenol derivatives of 20% by weight or less.

In comparison with the Mannich base formulations of the prior art used hitherto, which do not fall under this definition because they differ in at least one, preferably two and more especially all of the mentioned parameters, the multi-component mortars that can be produced in accordance with the invention exhibit significantly higher bond stress after curing, even at relatively high temperatures, such as at 80° C., so that they are still usable even at such a temperature. Furthermore, even on curing at −5° C. they generally exhibit better, or at least equally good, bond stress values in comparison with mortars produced using the Mannich base formulations from the prior art employed hitherto.

Viscosities are measured with a Brookfield rotary viscometer using spindle 3 at 23° C. at from 10 to 50 rev/min, preferably 10 rev/min.

In the following text, the term "mortar" is sometimes used instead of the term "curable composition".

A multi-component kit is to be understood as being especially a two-component kit (preferably a two-component kit having components (a) and (b)), preferably a two-compartment or multi-compartment device, wherein the components (a) and (b) that are capable of reacting with one another are so contained that they are unable to react with one another during storage, the components preferably being so contained that they do not come into contact with one another prior to use. Especially suitable are cartridges, for example made of plastics, ceramics or especially glass, in which the components are separated from one another by rupturable (for example rupturable when an anchoring means is driven into an opening, such as a drilled hole) partition walls, for example in the form of nested cartridges, such as ampoules; foil sachets having two or more compartments, or containers such as buckets or tubs having a plurality of compartments or sets (e.g. bundles) of two or more such containers, wherein two or more components of the curable composition in question, especially two components (a) and (b) as defined hereinabove and hereinbelow, are spatially separated from one another in the form of a kit or set, in which the contents, after being mixed together or while being mixed together, are applied to the site of use (especially by means of application tools such as trowels or brushes or a static mixer), for example a surface for fixing fibres, scrims, fabrics, composites or the like, or introduced into an opening, such as a drilled hole, especially for fixing anchoring means, such as anchoring rods or the like; and also multi-component or, especially, two-component cartridges the compartments of which contain the plurality of components or, preferably, two components (especially (a) and (b)) for a curable composition for fixing purposes, having the ingredients mentioned hereinabove and hereinbelow, for storage prior to use, such a kit preferably also comprising a static mixer. In the case of foil sachets and the multi-component cartridges, the multi-component kit may also include a discharge device, but this can preferably also be separate from the kit (for example for multiple use).

Unless otherwise indicated, hereinbelow proportions and contents given in percent relate to percent by weight.

It has proved to be advantageous when, in a multi-component kit according to the invention, the Mannich base formulation, considered by itself, has a content of free amines of 35% or more. "Free amines" denotes monomeric amines (or more generally amines that are not processed into Mannich bases, which could also contain additional amino groups), for example as defined as polyamines below, such as especially m-xylylenediamine.

For example, a multi-component kit, especially a two-component kit, as described hereinabove and especially hereinbelow, is a possible preferred embodiment wherein, based on the total weight of the Mannich base formulation, the Mannich bases are contained therein in a proportion of from 10 to 55%, preferably from 15 to 25%.

In multi-component kits, as described hereinabove and hereinbelow, that comprise flexibilizers (components that assist curing), such as benzyl alcohol, it has proved to be advantageous for the content of those substances in the Mannich base formulation to be 20% or less, for example between 0.5 and 20%, based on the weight of the Mannich base formulation.

The Mannich base formulations used for the multi-component kits according to the invention are advantageously produced by first preparing the Mannich base by reaction of (i) phenol derivatives, which are to be understood as including preferably aromatic di- or poly-ols, especially bisphenols, such as especially bisphenol F or more especially bisphenol A, with (ii) polyamines, preferably monomeric aliphatic, aromatic or more especially araliphatic diamines, such as especially xylylenediamines, more especially m-xylylenediamine (1,3-bis(aminomethyl)benzene); aliphatic polyamines, for example $C_1$-$C_{10}$alkane-di- or poly-amines, for example 1,2-diaminoethane, trimethylhexane-1,6-diamine, diethylenetriamine or triethyleneamine; cycloaliphatic amines, such as 1,2-diaminocyclohexane or bis(aminomethyl)tricyclodecane or bis(4-aminocyclohexyl)methane, or amine adducts; or mixtures of two or more thereof; especially mixtures of one or more araliphatic diamines, more especially m-xylylenediamine, with one or more other polyamines, or more especially one or more araliphatic diamines, especially m-xylylenediamine itself; (the phenol derivatives and the polyamines are advantageously first premixed at elevated temperature, for example above the melting point of the mixture in question, e.g. at about from 80 to 150° C.), and (iii) aldehydes, more especially aliphatic aldehydes, such as especially formaldehyde (which term may also include precursors such as trioxane or paraformaldeyde), the aldehydes advantageously being added and reacted in the form of an aqueous solution (especially at elevated temperature, such as from 50 to 90° C.) (especially with addition to a mixture of phenol derivatives and polyamines obtainable as above) and then, to produce the Mannich bases, heating the reaction mixture further (to shift the chemical equilibrium by removal of water advantageously under a (usually technical) vacuum), preferably at temperatures between 70 and 150° C., such as from 90 to 120° C.); and finally, to produce a Mannich base formulation for a two-component kit according to the invention, adjusting the Mannich base to the desired dilution (unless this is to be carried out only at a later stage, when component (b) is being assembled) with further free polyamine (free amine) and, if desired, an inert diluent, for example a solvent or solvent mixture, for example a hydrocarbon mixture or an alcohol, especially benzyl alcohol, it also being possible for some or all of this step to take place only on addition to the remaining constituents of component (b), so that only then are all the constituents of the Mannich base formulation in question present in a composition. The above preferred definitions of phenol derivatives, polyphenols and aldehydes can also be introduced at other places in the present description where those terms appear, in order to render preferred embodiments of the invention more specific. Conversely, the reactants and inert diluents are preferably used in amounts such that the quantity ratios mentioned hereinabove and hereinbelow as being preferred are obtained.

Advantageously, for the preparation of the Mannich base the molar ratio (prior to the subsequent addition of further free polyamine and optionally solvent) of the components phenol derivative:polyamine is from 1:20 to 20:1, especially from 1:5 to 5:1, and the molar ratio of the components polyamine:formaldehyde is from 10:1 to 1:10, especially from 2:1 to 1:2, very advantageously 1:1.

In a further preferred embodiment, the invention therefore relates to a multi-component kit as mentioned hereinabove or hereinbelow, characterized in that the Mannich base used for the Mannich base formulation is obtainable from phenol derivatives, preferably bisphenols, especially bisphenol A; polyamines, preferably araliphatic diamines, especially m-xylylenediamine, aliphatic amines and/or cyclo-aliphatic amines, and aldehydes, especially formaldehyde, preferably under the above conditions, for example under the conditions mentioned in Example 2, and with the respective reagents, especially preferred reagents, mentioned therein.

Especially good results are achieved when the Mannich base used for a multi-component kit, as described hereinabove and hereinbelow, is prepared with reaction of the phenol derivatives to leave 20% by weight, preferably 15% by weight, phenol derivatives or less.

This also applies when, for a multi-component kit as defined hereinabove and hereinbelow, there are used for the preparation of the Mannich bases an araliphatic diamine, especially m-xylylenediamine, an aliphatic or a cycloaliphatic diamine, or combinations of two or more thereof.

Special preference is also given to a multi-component kit as described hereinabove and hereinbelow, characterized in that the Mannich base formulation has H equivalents in the range from 45 to 75, a viscosity in the range from 1000 to 2000 mPa·s and a content of free phenol derivatives of 20% by weight or less.

In the multi-component kit, especially the two-component kit, as described hereinabove and hereinbelow, in an advantageous embodiment of the invention the ratio by weight of components (a):(b) is 10:1 or less, especially 5:1 or less, preferably 3:1 or less, the lower limit in each case advantageously being 1:2.

Surprisingly, it has also been found that by adding a tertiary amino compound, especially a tert-aminophenol (which is preferably added to component (b)), especially a 2,4,6-tris (di-$C_1$-$C_6$alkylamino)phenol, preferably 2,4,6-tris(dimethylamino)phenol, preferably in a proportion of up to 30% by weight, for example in a possible preferred embodiment of the invention from 0.01 to 20%, based on the curable components in (a) (epoxy resins and optionally reactive diluents), the glass transition temperature (temperature above which the solid, glassy material changes into a softer, rubber-like material), which is a measure of the usability of the cured mortars at high temperatures, can be increased further and accordingly the capacity for use at high temperatures can be further increased, so that multi-component kits according to the invention having such an additive are a further very preferred subject of the present invention.

Curable epoxy resins contained in component (a) are preferably polyglycidyl ethers of at least one polyvalent alcohol or phenol, such as novolak, bisphenol F or especially bisphenol A, or mixtures of such epoxides. The epoxy resins have an epoxy equivalent of from 120 to 2000, preferably from 150 to 400. The proportion of epoxy component (a) is from >0 to 100%, preferably from 10 to 60%.

In addition to the constituents mentioned hitherto, the multi-component kits according to the invention, as mentioned hereinabove and hereinbelow, may also comprise further customary additives (the person skilled in the art will know to what extent such constituents should not come into contact with the components of a multi-component kit according to the invention, such as, especially, a two-component kit having the components (a) and (b), prior to mixing for use).

Such additives include especially one or more additives selected from reactive diluents, plasticisers, stabilizers, antioxidants, curing catalysts, rheology auxiliaries, thixotropic agents, agents for controlling the rate of reaction, wetting agents, colouring additives and fillers, and also further additives.

As reactive diluents (which should not be present in a hardener component, that is to say are preferably contained (in the case of a two-component system solely) in component (a)) there are used glycidyl ethers of aliphatic, cycloaliphatic, araliphatic or aromatic mono- or especially poly-alcohols, such as monoglycidyl ethers, e.g. o-cresyl glycidyl ethers, and/or especially glycidyl ethers having an epoxy functionality of at least 2, such as 1,4-butanediol diglycidyl ether, cyclohexanedimethanol diglycidyl ether, hexanediol diglycidyl ether and/or especially tri- or higher glycidyl ethers, e.g. glycerol triglycidyl ether, pentaerythritol tetraglycidyl ether or trimethylolpropane triglycidyl ether, or mixtures of two or more such reactive diluents, preferably triglycidyl ethers. The reactive diluents are present preferably in amounts of from 0 to 60% by weight, especially from 1 to 20% by weight, based on the total weight of the epoxy component (a).

As fillers there are used customary fillers, especially cements, chalks, quartz powder or the like, which may be added in powder form, in granular form or in the form of moulded bodies, or other forms, such as, for example, those mentioned in WO 02/079341 and WO 02/079293 (which in this regard are incorporated by reference herein) or mixtures thereof. The fillers can be present in one or more components of a multi-component kit according to the invention, for example one or both of components (a) and (b) of a corresponding two-component kit; the proportion, based on the total weight of the curable composition, is preferably from 0 to 70% by weight, preferably from 5 to 55% by weight.

Further additives which may be present include plasticisers, non-reactive diluents or flexibilizers, stabilizers, curing catalysts, rheology auxiliaries, thixotropic agents, agents for controlling the reaction rate, wetting agents, colouring additives, such as dyes or especially pigments, for example for differently colouring the components for the purpose of better monitoring their intermixing, or additives, or the like, or mixtures of two or more thereof. Preferably such further additives can be present in total, based on the whole curable composition, in a total of from 0 to 30% by weight.

In a very especially preferred embodiment, the invention relates to the use of a Mannich base formulation having Mannich bases with H equivalents in the range from 40 to 80, a viscosity in the range from 500 to 2700 mPas and a content of free phenol derivatives of 20% by weight or less, for the preparation of hardeners for epoxy resins having an extended processing temperature range and for increasing the bond stress in the cured state even at high temperatures, for example from 70 to 80° C. Preference is given to the use of the above-mentioned Mannich base formulations (especially those described above as being preferred) in a multi-component kit characterized hereinabove and hereinbelow as being preferred (it also being possible for the Mannich base formulation in question to be completed only by mixing of one or more of its components (Mannich base(s), free polyamine(s), flexibilizer(s)) with any further constituents of the hardener component (b), that is to say it does not exist at all in free form).

In a further preferred embodiment, the invention relates to the use of a tertiary amino compound, advantageously a tert-aminophenol (which is preferably added to component (b)), especially a 2,4,6-tris(di-$C_1$-$C_6$alkylamino)phenol, preferably 2,4,6-tris-(dimethylamino)phenol, in hardener components (b) (especially those comprising Mannich base formulations used according to the invention) as a constituent of epoxy mortars (especially multi-component, such as two-component, epoxy mortars). The bond stress is determined by pull-out tests on anchoring rods M12 from concrete at a setting depth of 95 mm.

The permissible temperature range for the cured product is likewise determined by a pull-out test.

The measurement of the glass transition temperature is effected by means of DSC in accordance with ISO 3146 on specimens that are cured for 24 hours and subjected to thermal treatment at 80° C. for 30 min.

In further advantageous embodiments, the invention relates also to the use of multi-component kits, especially two-component kits, according to the invention for fixing fibres, scrims, fabrics or composites, especially made of high modulus fibres, preferably carbon fibres, especially for reinforcing buildings, for example walls or ceilings or floors; or for fixing building components, such as panels or blocks, e.g. made of stone, glass or plastics, to structures or building components; but especially for fixing anchoring means, such as anchoring rods, bolts or the like, in openings, such as drilled holes, wherein the components of the multi-component kit, after being mixed beforehand and/or while being mixed (for example by means of a static mixer or by rupture of a cartridge or a film sachet or by mixing components from multi-compartment buckets or sets of buckets) are applied to the surface of a substrate or, in the case of anchoring means, introduced into openings, such as drilled holes, in a substrate.

EXAMPLES

The following Examples serve to illustrate the invention but do not limit the scope thereof.

Example 1

Mortars Obtained Using Mannich Bases for Use According to the Invention and, as Comparison Tests, Mortars Obtained Using Known Mannich Bases a) Mortars in accordance with the composition of the components mentioned below are produced by mixing and then, as described above, the respective bond stress values obtained after curing are determined ("parts" are parts by weight, based on the mixture without Mannich base hardener):

Epoxy component (A):

a) 100 parts of standard epoxy resin based on bisphenol A/F having an epoxy equivalent of from 169 to 181 (D.E.R. 351 from The Dow Chemical Company, Schwalbach, Germany)

b) 20 parts of a reactive diluent having an epoxy equivalent of from 140 to 150 (R 12 from UPPC AG, Mietingen-Baltringen, Germany)

c) 90 parts of Dyckerhoff Portland cement CEM I.

Hardener component (B):

a) Mannich base formulation as indicated in the following Table as hardener.

The mixing stoichiometry is calculated by means of the epoxy equivalent values and the H equivalents.

The glass transition temperature in ° C. of cured mortars with or without the additions of TDAP, as indicated in the following Table, is used as a measure of the high temperature stability of the cured mortars.

TABLE

Bond stress values using different Mannich base formulations

| Mannich base formulation as hardener component | Content of free phenol derivatives [% by weight] | H equivalent | Viscosity [mPa·s] | Bond stress [N/mm²] at −5° C. Curing 96 h at −5° C. | Bond stress [N/mm²] at 80° C. (curing 12 h at 20° C.) |
|---|---|---|---|---|---|
| according to Example 2 (according to the invention)* | 15 | 52 | 1800 | 30 | 21 |
| Epicure 197 | 30-40 | 75 | 250-350 | 30 | 5 |
| Aradur 2992 | n.m. | 55 | 25-30 | 29 | 6 |
| Rutadur H91 | n.m. | 53.5 | 800-900 | 9 | 9 |
| Epicure 3282 | 25 | 38 | 5500-6500 | 12 | 15 |

*content of free amine 40-50% n.m.=not measured

Epicure 197 and Epicure 3282 are trade marks of Resolution Performance Products, IIc., Resolution Europe B.V., AN Hoogvliet Rt, Netherlands;

Aradur 2992 is a trade mark of Huntsman, Everberg, Belgium (formerly Vantico AG, Basle, Switzerland);

Rütadur H91 is a trade mark of Bakelite AG, Iserlohn, Germany, content of free amine <25%.

Viscosity is measured at 23° C. using a Brookfield rotary viscometer spindle 3, 10 rev/min.

It can be seen from the Table that the Mannich base formulations added in accordance with the invention have the effect that the mortars are able to withstand particularly high temperatures after curing, without a decline in bond stress, and when used at low temperatures in one case exhibit comparable bond stress and otherwise exhibit better bond stress than the comparison mortars.

b) Otherwise using the same component ratios as those indicated above under a) and the Mannich base formulation indicated as being according to the invention in the Table, the glass transition temperature on addition of different amounts of 2,4,6-tris-(dimethylamino)phenol (Air Products Nederland B.V, Utrecht, Netherlands), hereinafter TDAP, to the Mannich base formulation is determined below at various TDAP contents (given in % by weight, based on the curable substances in component (A)).

TABLE

Glass transition temperatures at different TDAP contents

| Starting from curable composition with Mannich base formulation of Example 2 (according to the invention): content of TDAP [% by weight] | Glass transition temperature [° C.] |
|---|---|
| 0 | 77 |
| 1.5 | 88 |
| 5 | 97 |
| 10 | 103 |

It is found that the addition of TDAP results in a significant increase in the glass transition temperature, so that compositions comprising TDAP represent an especially preferred embodiment of the invention.

Example 2

Preparation of a Mannich Base for Use According to the Invention 400 parts by weight of diphenylolpropane (bisphenol A) in molten form are stirred with 240 parts of m-xylylenediamine (MXDA). The mixture is cooled to about 80° C. and 145 parts of formaldehyde (36%) are added, with stirring. With a continuous reduction in pressure and simultaneous heating at a maximum of 110° C., the water is distilled off. The Mannich base so obtained is diluted with further m-xylylenediamine and optionally benzyl alcohol to give a Mannich base formulation according to the invention, for example to give a preparation containing approximately 50% by weight MXDA, approximately 15% by weight free phenol component and approximately 10% by weight benzyl alcohol. Characteristics of the composition can also be found in the first Table in Example 1.

The invention claimed is:

1. A multi-component kit for a curable composition for fixing purposes, comprising:
   an epoxy resin component (a), which comprises curable epoxides; and
   a hardener component (b), which comprises a Mannich base formulation, characterized in that the Mannich base formulation has H equivalents in the range from 40 to 80, a viscosity in the range from 500 to 2700 mPas, a content of free amines of 35% by weight or more, and a content of free phenol derivatives of 20% by weight or less.

2. A multi-component kit according to claim 1, characterized in that the multi-component kit is a two-component kit.

3. A multi-component kit according to claim 1, characterized in that the Mannich bases in the Mannich base formulation are contained in a proportion of from 10 to 55% by weight.

4. A multi-component kit according to claim 1, characterized in that benzyl alcohol is contained in the Mannish base formulation in a proportion of 20% by weight or less.

5. A multi-component kit according to claim 1, characterized in that the Mannich bases in the Mannich base formulation are prepared with reaction of the phenol derivatives to leave 20% by weight phenol derivatives or less.

6. A multi-component kit according to claim 1, characterized in that the Mannich bases in the Mannich base formulations are obtained from (a) bisphenols; (b) at least one of araliphatic diamines, aliphatic amines, and cycloaliphatic amines; and (c) formaldehyde.

7. A multi-component kit according to claim 1, characterized in that for the preparation of the Mannich bases there are used meta-xylylenediamine, also an aliphatic or a cycloaliphatic diamine, or combinations of two or more thereof.

8. A multi-component kit according to claim 1, characterized in that the Mannich base formulation has H equivalents in the range from 45 to 75, a viscosity in the range from 1000 to 2000 mPa·s and a content of free phenol derivatives of 20% by weight or less.

9. A multi-component kit according to claim 1, characterized in that the ratio by weight of components (a):(b) is from 10:1 to 1:1.

10. A multi-component kit according to claim 1, characterized in that it comprises in component (b) additionally a tertiary amino compound.

11. A multi-component kit according to claim 3, characterized in that the Mannich bases in the Mannich base formulation are contained in a proportion from 15% to 25% by weight.

12. A multi-component kit according to claim 5, characterized in that the Mannich bases in the Mannich base formulation are prepared with reaction of the phenol derivatives to leave 15% by weight phenol derivatives or less.

13. Multi-component kit according to claim 9, characterized in that the multi-component kit is a two-component kit and that the ratio by weight of components (a):(b) is from 3:1 to 1:1.

14. Multi-component kit according to claim 10, characterized in that the tertiary amino compound is 2,4,6-tris(dimethylamino)phenol.

* * * * *